May 6, 1924.

W. H. SONLEY

MACHINE FOR MANUFACTURING PIPES OR OTHER HOLLOW BODIES EITHER WHOLLY
OR IN PART FROM CONCRETE AND OTHER CEMENTITIOUS MATERIAL

Filed Sept. 19, 1922   3 Sheets-Sheet 1

1,493,399

Inventor
W. H. Sonley
By Marker Clerk
Atty's

May 6, 1924.  
W. H. SONLEY  
1,493,399
MACHINE FOR MANUFACTURING PIPES OR OTHER HOLLOW BODIES EITHER WHOLLY OR IN PART FROM CONCRETE AND OTHER CEMENTITIOUS MATERIAL
Filed Sept. 19 1922    3 Sheets-Sheet 3
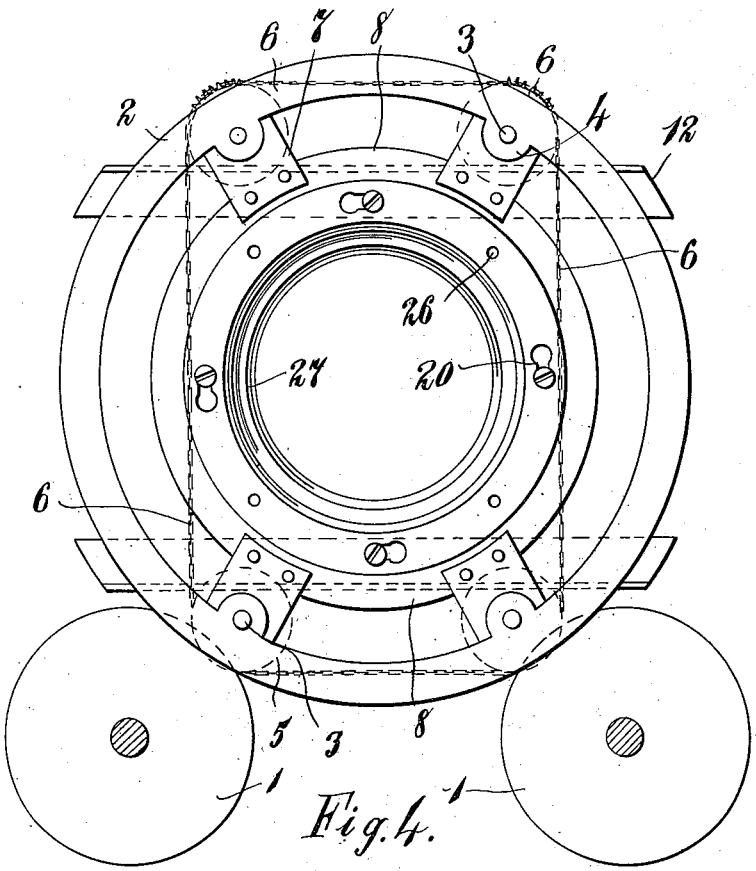
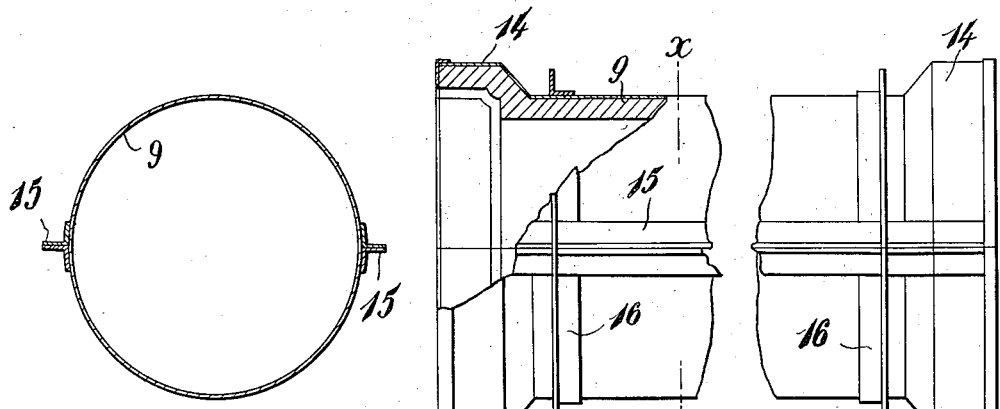

Patented May 6, 1924.

1,493,399

UNITED STATES PATENT OFFICE.

WINTON HENRY SONLEY, OF LEE, LONDON, ENGLAND, ASSIGNOR TO HUME PIPE AND CONCRETE CONSTRUCTION COMPANY LIMITED, OF LONDON, ENGLAND.

MACHINE FOR MANUFACTURING PIPES OR OTHER HOLLOW BODIES EITHER WHOLLY OR IN PART FROM CONCRETE AND OTHER CEMENTITIOUS MATERIAL.

Application filed September 19, 1922. Serial No. 589,221.

*To all whom it may concern:*

Be it known that I, WINTON HENRY SONLEY, a subject of the King of Great Britain and Ireland, late of Rock House, Stanton Gate, in the county of Derby, England, and now residing at 107 High Road, Lee, London, S. E. 13, England, have invented certain new and useful Improvements in or Relating to Machines for Manufacturing Pipes or Other Hollow Bodies Either Wholly or in Part from Concrete and Other Cementitious Material, of which the following is a specification.

This invention relates to machines for manufacturing pipes and other hollow bodies (hereinafter termed "pipes"), either wholly or in part from concrete or other cementitious materials, and of the type in which mould cases held between end rings bolted together longitudinally outside the said mould cases, are rotated, while the end rings are supported on pairs of friction rollers, the mould cases with their end rings being thus spun, and the pipe is formed by centrifugal action during the spinning of the said mould with its end rings. In such apparatus, the cementitious material is fed into the interior of the mould during the time the mould is spinning, and the centrifugal action causes the material to evenly distribute itself and consolidate on the interior of the mould, and after the excess of moisture has been exuded by the centrifugal action and the pipe has been consolidated sufficiently to maintain its form, the spinning of the mould is stopped, and the mould with the end rings is removed from the friction rollers and allowed to stand until the cement has permanently set. The end rings are then removed by slackening the outside tie bolts and the mould can be opened, thus releasing the formed pipe.

In running a machine of this type, numbers of sets of end rings, tie bolts, and moulds are required, because each set of these parts has to stand with the pipe which is being formed therein for a considerable period, and the machine can deal with the operation of a large number of moulds in the course of a day. The mould itself is commonly made of thin sheet metal, and it is the lightest portion of the parts making up the mould unit, the end rings and tie bolts being a heavy and costly part of the structure.

According to the present invention, the sheet metal portion of the mould which is held between the end rings, is the only portion which remains around the pipe during the time the latter is setting. The end rings and the tie bolts are now modified in order that they may become a permanent part of the machine and not be removed with the formation of each pipe.

It will be readily recognized that by utilizing the end rings or their equivalents and the tie bolts for holding the end rings against the mould as a permanent structure, and not requiring these parts to be multiplied for each set of moulds, a simplified construction is obtained of the machinery as a whole, and the cost of the machines and the cost of manufacture of the pipes is materially reduced, and the manufacture is carried out in a more speedy and efficient manner than heretofore.

In order that the invention may be clearly understood, reference is made to the accompanying drawings, in which:—

Figure 4 is an end view of the same.

Figure 5 is a side elevation, partly in section, of the mould without the end rings, and Figure 6 is a cross section on the line X—Y of Figure 5.

Figure 1:
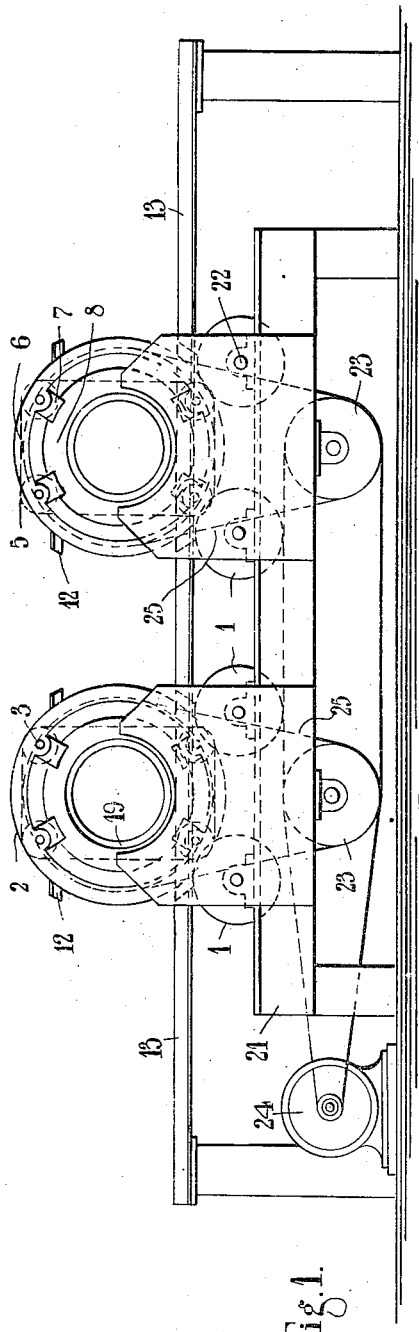
Figure 1 is a side elevation showing an example of construction, in which two sets of supporting rollers are shown supporting two sets of moulds with their end rings in position on the friction rollers.
Figure 2:
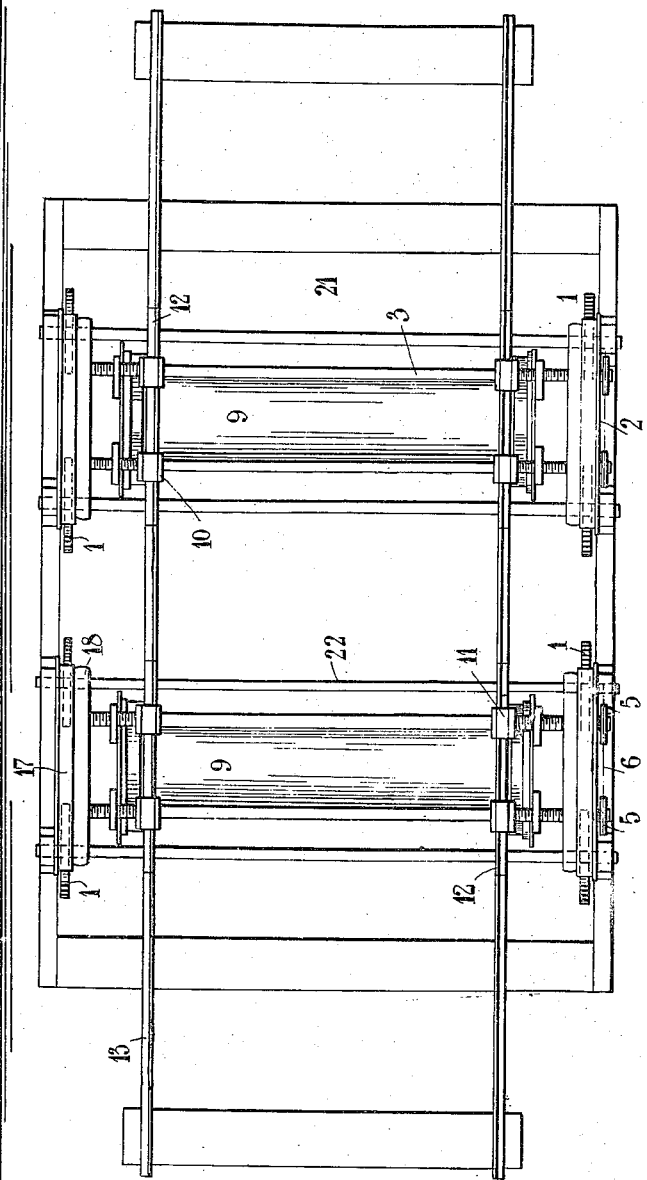
Figure 2 is a plan view of the same machine.
Figure 3:
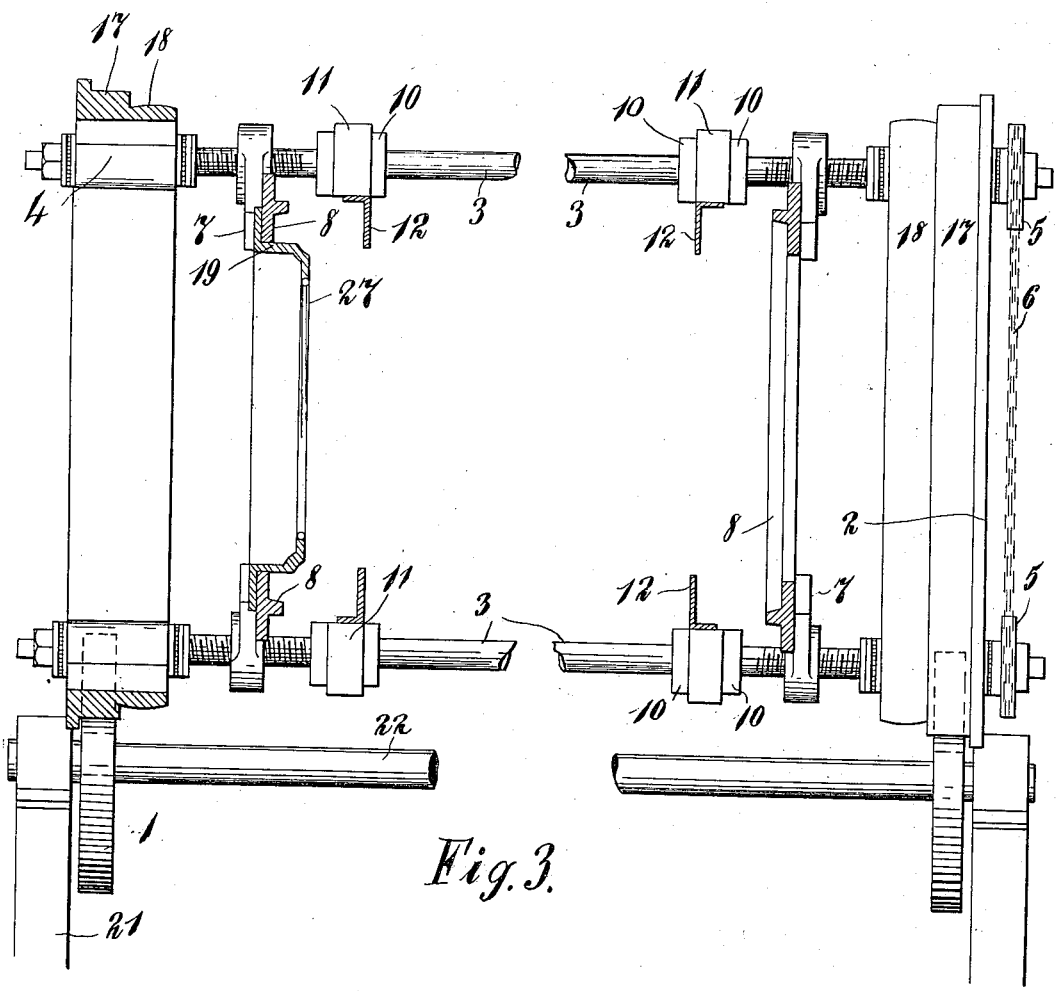
Figure 3 is an elevation, partly in section, drawn to a larger scale than the previous figures, showing the end rings or runners carried on their friction rollers in the machine in their permanent position, and also showing means for receiving the moulds.

1, 1 are the supporting rollers, which are free to turn on their axes and which support the end rings or runners 2. These runners are tied permanently together by four shafts 3, which are mounted in bearings 4 carried in the runners 2 and which can be rotated simultaneously by the rotation of one of the shafts 3 by means of a key, which shaft 3 in turn rotates the other shafts 3 by means of gearing which may suitably be sprocket wheels 5 connected by a chain 6, or by an interior gear wheel (not shown).

The shafts 3 have right- and left-hand screw threads on each shaft, the right-hand threads being on one end and the left-hand threads being on the other end of each shaft, in such a way that by rotating the shafts in one direction, clamping caps 8 are simultaneously moved towards or away from each other by means of outstanding lugs 7 engaging the screw threads. This movement is in the line of the axis of rotation, and the clamping caps 8 are of a form to receive the ends of the mould 9 between them when they are in the position most distanced from each other, and the mould 9 being held in position ready to be received by the caps, is then connected to the caps by rotation of the shafts 3, causing the caps 8 to approach each other.

On the central portions of the shafts 3 between the screw-threaded portions, pairs of collars 10 are fixed which hold bearings 11 in position on the shafts 3 while permitting the bearings to remain stationary during the rotation of the said shafts 3. These bearings carry short lengths of rail 12, which, when the mechanism carried by the runners 2 has been stopped, may be brought horizontal and in line with stationary rails 13, by adjusting the runners on the supporting rollers.

The mould 9 is constructed preferably of thin sheet metal, and is formed with enlarged diameters at 14 one or both ends as occasion may require, and is divided longitudinally into two halves which are secured together by suitable bolts or keys engaging with angle pieces 15 attached to the body of the mould. Around the body of the mould are fixed two angle rings 16 which form flanged wheels for the mould when rolling it on to the rails 13 to place it in position in the machine, and these angle pieces 15 and 16 also serve to stiffen and strengthen the mould.

The runners 2 each comprise a ring, the periphery of which is stepped to form a running surface 17 which engages with the supporting rollers 1 and a pulley surface 18 to receive a driving belt.

The caps 8 are each formed with a concentric opening to carry a core 19 for forming a socket end to the pipe. This core is adapted to project within the enlarged portion 14 of the mould 9 and is secured to the outer face of the cap 8 by means of keyhole slots and screws 20.

A main frame 21 carries bearings for receiving shafts 22 extending across the machine, each shaft adjacent to its ends carrying supporting rollers 1, 1, and this frame 21 also carries bearings for two pulleys 23 driven from a source of power indicated at 24 (see Figure 1). These pulleys 23 drive the runners 2 by means of belts 25. The before-mentioned stationary rails 13 are supported in any suitable manner above the main frame 21, When an empty mould 9 is rolled along the stationary rails 13 onto the short lengths of rail 12 into a position concentric with the axis of one of the pairs of runners 2, the clamping caps 8 are approached towards each other and the enlarged ends 14 of the mould are received by the caps 8, becoming centralized in the conical recesses, and firmly clamped between them. This movement is effected through the chain and sprocket gear before mentioned, simultaneously turning the shafts 3 and causing a traverse of the lugs 7. The mould being now firmly held in position and the core 19 projecting within the mould, the runners are driven through the driving pulleys 23, and belts 25 and the operator feeds the cementitious material into the mould.

When the pipe is formed within the mould by centrifugal action, the driving mechanism is stopped, the short rails 12 are adjusted to the horizontal position, and the cores 19 are given a slight to and fro angular motion to loosen them from the cementitious material within the mould by means of any suitable tool, which may, for instance, engage with holes 26 formed for it in the outer ring of the core 19.

When this loosening action has taken place, the two clamping caps 8 are drawn away from each other by a reverse movement of the shafts 3 and disengage themselves from the mould 9, and the cores are carried out of the mould with the caps 8. The mould is then removed by rolling it away along the short lengths of rails 12 onto the stationary rails 13 out of the machine. During the making of the pipes the surplus water is exuded to the interior of the pipe, and this water is allowed to flow away by removing an expansible water ring 27 which is suitably constructed of a helical spring covered with water-proof material.

It will be seen that in this construction, the sets of runners remain permanently in position on the machine to receive successively any number of moulds, and this enables an unlimited number of moulds to be used in conjunction with one or more sets of runners 2 and clamping caps 8, these latter having become a permanent part of the machine.

By this means the output of a machine will be considerably increased and the labour diminished, as the heavier parts, such as the clamping caps 8 and runners 2 remain, while the lighter parts, such as the moulds 9, are easily rolled along the rails 12, 13 to the outside of the machine, whence they are removed and placed aside until the cement has properly set.

Having now described my invention, what I claim as new and desire to secure by Letters Patent is:—

1. In a centrifugal machine for making pipes, a central mould, runners co-operating to support said mould, and longitudinally adjustable clamping caps for detachably fastening said mould to said runners.

2. In machines as claimed in claim 1, longitudinally adjustable clamping caps gripping mould when distanced from runners, and releasing mould when drawn towards runners.

3. In machines as claimed in claim 1, shafts permanently tying together said runners, and co-operating to support said mould and said longitudinally adjustable clamping caps.

4. In machines as claimed in claim 1, runners firmly connected by distance shafts, longitudinally adjustable clamping caps between the runners, and screw means for adjusting the caps to and from the runners to grip the mould between the caps or to release it at will.

5. In machines as claimed in claim 2, runners connected together by rotatable shafts having right- and left-hand screw threads between the runners, clamping caps between the said runners and operated by the right- and left-hand threads, and means for operating all the screw shafts simultaneously.

6. In machines as claimed in claim 1, short rails supported on two of the shafts to receive the mould on its release and guide and support it to a stationary track or platform.

In testimony whereof I have signed my name to this specification.

WINTON HENRY SONLEY.